US011170944B2

(12) United States Patent
Knopsnyder et al.

(10) Patent No.: US 11,170,944 B2
(45) Date of Patent: Nov. 9, 2021

(54) ULTRACAPACITOR WITH A LOW LEAKAGE CURRENT

(71) Applicant: AVX Corporation, Fountain Inn, SC (US)

(72) Inventors: Jonathan Robert Knopsnyder, Fountain Inn, SC (US); Shawn Hansen, Simpsonville, SC (US)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 0 days.

(21) Appl. No.: 16/132,849

(22) Filed: Sep. 17, 2018

(65) Prior Publication Data

US 2019/0088421 A1    Mar. 21, 2019

Related U.S. Application Data

(60) Provisional application No. 62/559,772, filed on Sep. 18, 2017.

(51) Int. Cl.
| | |
|---|---|
| *H01G 11/52* | (2013.01) |
| *H01G 11/42* | (2013.01) |
| *H01G 11/68* | (2013.01) |
| *H01G 11/28* | (2013.01) |
| *H01G 11/32* | (2013.01) |
| *H01G 11/78* | (2013.01) |
| *H01G 11/58* | (2013.01) |

(52) U.S. Cl.
CPC ............. *H01G 11/42* (2013.01); *H01G 11/28* (2013.01); *H01G 11/32* (2013.01); *H01G 11/52* (2013.01); *H01G 11/68* (2013.01); *H01G 11/58* (2013.01); *H01G 11/78* (2013.01)

(58) Field of Classification Search
None
See application file for complete search history.

(56) References Cited

U.S. PATENT DOCUMENTS

| | | | |
|---|---|---|---|
| 6,183,901 B1 * | 2/2001 | Ying | ................... H01M 10/052 429/129 |
| 6,576,365 B1 | 6/2003 | Meitav et al. | |
| 6,790,556 B1 | 9/2004 | Meitav et al. | |
| 7,170,739 B1 * | 1/2007 | Arora | ....................... H01G 9/02 361/502 |

(Continued)

OTHER PUBLICATIONS

International Search Report for PCT/US2018/051288 dated Jan. 4, 2019.

*Primary Examiner* — Dion Ferguson
(74) *Attorney, Agent, or Firm* — Dority & Manning, P.A.

(57) ABSTRACT

An ultracapacitor that contains at least one electrochemical cell is provided. The cell includes a first electrode that contains a first carbonaceous coating (e.g., activated carbon particles) electrically coupled to a first current collector, a second electrode that contains a second carbonaceous coating (e.g., activated carbon particles) electrically coupled to a second current collector, an aqueous electrolyte in ionic contact with the first electrode and the second electrode and that contains a polyprotic acid (e.g., sulfuric acid), and a separator that is positioned between the first and second electrodes. Through selective control over the particular nature of the materials used to form the ultracapacitor, as well as the manner in which they are formed, a variety of beneficial properties may be achieved.

18 Claims, 1 Drawing Sheet

(56) References Cited

U.S. PATENT DOCUMENTS

| | | |
|---|---|---|
| 8,345,406 B2 | 1/2013 | Dreissig et al. |
| 10,121,607 B2 * | 11/2018 | Joos ................ H01G 11/32 |
| 2002/0042986 A1 * | 4/2002 | Sato ................ H01G 11/56 |
| | | 29/623.5 |
| 2004/0118287 A1 * | 6/2004 | Jaffe ................ B01D 53/0423 |
| | | 96/121 |
| 2005/0175894 A1 * | 8/2005 | Visco ................ H01M 4/366 |
| | | 429/212 |
| 2005/0201041 A1 * | 9/2005 | Hinoki ................ H01G 11/22 |
| | | 361/502 |
| 2005/0220989 A1 * | 10/2005 | Chaturvedi ........ H01M 4/0419 |
| | | 427/122 |
| 2006/0098389 A1 | 5/2006 | Liu et al. |
| 2007/0070581 A1 * | 3/2007 | Yoshida ................ H01G 11/32 |
| | | 361/502 |
| 2010/0002362 A1 * | 1/2010 | Clelland ................ H01G 11/12 |
| | | 361/502 |
| 2010/0279201 A1 * | 11/2010 | Mofakhami ........ C01B 3/0031 |
| | | 429/492 |
| 2011/0028599 A1 * | 2/2011 | Costantino ............ B82Y 30/00 |
| | | 523/309 |
| 2011/0206992 A1 * | 8/2011 | Campbell ................ H01G 11/24 |
| | | 429/235 |
| 2012/0236467 A1 | 9/2012 | Kang et al. |
| 2013/0224632 A1 * | 8/2013 | Roumi ................ H01M 4/5825 |
| | | 429/516 |
| 2015/0093629 A1 * | 4/2015 | Sayre ................ H01M 2/0262 |
| | | 429/156 |
| 2015/0236322 A1 * | 8/2015 | Laramie ............ H01M 50/403 |
| | | 429/145 |
| 2015/0270522 A1 * | 9/2015 | Yamada ................ H01M 50/44 |
| | | 429/145 |
| 2016/0039680 A1 * | 2/2016 | Jacob ................ C01B 32/366 |
| | | 427/122 |
| 2016/0260551 A1 | 9/2016 | Nanda et al. |
| 2017/0125176 A1 | 5/2017 | Chen et al. |
| 2017/0263908 A1 | 9/2017 | Laicer et al. |
| 2017/0338054 A1 * | 11/2017 | Knopsnyder ............ H01G 11/76 |
| 2018/0204689 A1 * | 7/2018 | Brambilla ................ H01G 11/68 |

* cited by examiner

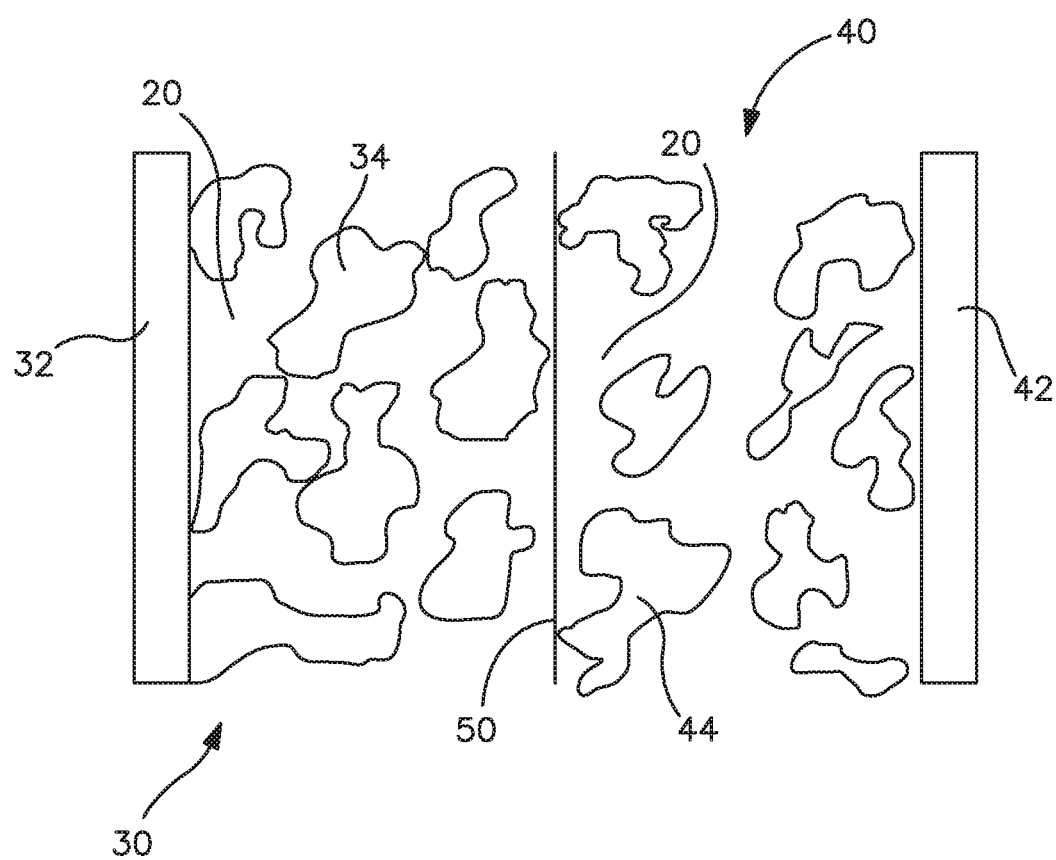

US 11,170,944 B2

ULTRACAPACITOR WITH A LOW LEAKAGE CURRENT

CROSS REFERENCE TO RELATED APPLICATION

The present application claims filing benefit of United States Provisional Patent Application Ser. No. 62/559,772 having a filing date of Sep. 18, 2017, which is incorporated herein by reference in its entirety.

BACKGROUND OF THE INVENTION

Electrical energy storage cells are widely used to provide power to electronic, electromechanical, electrochemical, and other useful devices. An electric double layer ultracapacitor, for instance, generally employs a pair of polarizable electrodes that contain carbon particles (e.g., activated carbon) impregnated with a liquid electrolyte. Due to the effective surface area of the particles and the small spacing between the electrodes, large capacitance values may be achieved. Nevertheless, problems remain. For instance, one of the problems often associated with such ultracapacitors is that they tend to exhibit a relatively high leakage current ("DCL") over time, which can decrease the shelf life of the ultracapacitor and limit its use in certain applications. As such, a need currently exists for an improved ultracapacitor.

SUMMARY OF THE INVENTION

In accordance with one embodiment of the present invention, an ultracapacitor is disclosed that comprises an electrochemical cell that contains a first electrode, a second electrode, separator positioned between the first and second electrodes, and an aqueous electrolyte that is ionic contact with the first and second electrodes. The first electrode comprises a first current collector electrically coupled to a first carbonaceous coating and the second electrode comprises a second current collector electrically coupled to a second carbonaceous coating. The separator contains a crosslinked polymer film. Further, after being subjected to an applied voltage for 180 minutes, the ultracapacitor exhibits a leakage current of only about 1 microamp or less.

In accordance with another embodiment of the present invention, an ultracapacitor is disclosed that comprises an electrochemical cell that contains a first electrode, a second electrode, separator positioned between the first and second electrodes, and an aqueous electrolyte that is ionic contact with the first and second electrodes. The first electrode comprises a first current collector electrically coupled to a first carbonaceous coating and the second electrode comprises a second current collector electrically coupled to a second carbonaceous coating. The separator contains a crosslinked polymer film.

Other features and aspects of the present invention are set forth in greater detail below.

BRIEF DESCRIPTION OF THE DRAWING

A full and enabling disclosure of the present invention, including the best mode thereof, directed to one of ordinary skill in the art, is set forth more particularly in the remainder of the specification, which makes reference to the appended figure in which:

FIG. 1 is a schematic view illustrating one embodiment for forming an electrode assembly that can be used in the ultracapacitor of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to an ultracapacitor that contains at least one electrochemical cell. The cell includes a first electrode that contains a first carbonaceous coating (e.g., activated carbon particles) electrically coupled to a first current collector, a second electrode that contains a second carbonaceous coating (e.g., activated carbon particles) electrically coupled to a second current collector, an aqueous electrolyte in ionic contact with the first electrode and the second electrode, and a separator that is positioned between the first and second electrodes. Referring to FIG. 1, for example, one embodiment of an ultracapacitor 10 is schematically shown that includes an aqueous electrolyte 20 in contact with a first electrode and a second electrode. The first electrode contains a first current collector 32 electrically coupled to a first carbonaceous coating 34 and the second electrode contains a second current collector 42 electrically coupled to a second carbonaceous coating 44. A separator 50 is also positioned between the electrodes to electrically isolate them from one another to help prevent an electrical short, but still allow transport of ions between the two electrodes.

The present inventors have discovered that through selective control over the particular nature of the materials used to form the ultracapacitor, as well as the manner in which they are formed, a variety of beneficial properties may be achieved. For example, a crosslinked polymer film is employed as the separator. The film may have a relatively large thickness in comparison to the overall thickness of the cell (includes the electrodes and crosslinked film). That is, the ratio of the thickness of the film to the thickness of the cell is typically from about 0.05 to about 1, in some embodiments from about 0.1 to about 0.9, and in some embodiments, from about 0.2 to about 0.8. The thickness of the film may, for instance, be from about 50 to about 10,000 micrometers, in some embodiments from about 10 to about 5,000 micrometers, and in some embodiments, from about 500 to about 1,000 micrometers, while the thickness of the cell may be from about from about 0.1 to about 25 millimeters, in some embodiments from about 0.5 to about 20 millimeters, and in some embodiments, from about 1 to about 10 millimeters.

Without intending to be limited by theory, it is believed that the use of a crosslinked polymer film with a relatively large thickness can help increase the degree of ionic transport through the separator, and in turn, reduce leakage current. Thus, for example, after being subjected to an applied voltage (e.g., rated voltage) for 180 minutes, the ultracapacitor may exhibit a leakage current ("DCL") of only about 1 microamp ("µA") or less, in some embodiments about 0.8 µA or less, in some embodiments about 0.5 µA or less, and in some embodiments, from about 0.01 to about 0.3 µA. The ultracapacitor may also exhibit other good electrical properties. For example, the capacitance may be relatively high, such as about 6 Farads per cubic centimeter ("F/cm$^3$") or more, in some embodiments about 8 F/cm$^3$ or more, in some embodiments from about 9 to about 100 F/cm$^3$, and in some embodiments, from about 10 to about 80 F/cm$^3$, measured at a temperature of 23° C., frequency of 120 Hz, and without an applied voltage. The ultracapacitor may also have a low equivalence series resistance ("ESR"), such as about 150 mohms or less, in some embodiments less than about 125 mohms, in some embodiments from about 0.01 to about 100 mohms, and in some embodiments, from about 0.05 to about 70 mohms, determined at a temperature of 23° C., frequency of 1 kHz, and without an applied voltage. Notably, such electrical properties can also be maintained under various extreme conditions, such as at a high temperature and/or humidity level. For example, the ultracapacitor may be placed into contact with an atmosphere having a temperature of from about 50° C. or more, in some embodiments from about 55° C. to about 120° C., and in some embodiments, from about 60° C. to about 100° C. (e.g., 60° C., 70° C., or 75° C.). The ultracapacitor may also be exposed to high humidity levels, such as a relative humidity of about 40% or more, in some embodiments about 60% or more, and in some embodiments, about 70% or more (e.g., 85% or 95%). Relative humidity may, for instance, be determined in accordance with ASTM E337-02, Method A (2007). Notably, the present inventors have discovered that the leakage current, capacitance, and ESR values can remain within the ranges noted above even when exposed to the high temperatures and/or relative humidity levels noted above, such as for a time period of about 100 hours or more, in some embodiments from about 300 hours to about 5000 hours, and in some embodiments, from about 600 hours to about 4500 hours (e.g., 168, 336, 504, 672, 840, 1008, 1512, 2040, 3024, or 4032 hours).

Various embodiments of the present invention will now be described in more detail.

I. Electrodes

As indicated above, the first and second electrodes of the present invention contain first and second current collectors, respectively. It should be understood that additional current collectors may also be employed if desired, particularly if the ultracapacitor includes multiple energy storage cells. The current collectors may be formed from the same or different materials. Regardless, each collector is typically formed from a substrate that includes a conductive metal, such as aluminum, stainless steel, nickel, silver, palladium, etc., as well as alloys thereof. Aluminum and aluminum alloys are particularly suitable for use in the present invention. The substrate may be in the form of a foil, sheet, plate, mesh, etc. The substrate may also have a relatively small thickness, such as about 200 micrometers or less, in some embodiments from about 1 to about 100 micrometers, in some embodiments from about 5 to about 80 micrometers, and in some embodiments, from about 10 to about 50 micrometers. Although by no means required, the surface of the substrate may be optionally roughened, such as by washing, etching, blasting, etc.

If desired, one or more of the current collectors may contain a plurality of fiber-like whiskers that project outwardly from the substrate. The whiskers are typically formed from a material that contains carbon and/or a reaction product of carbon and the conductive metal. In one embodiment, for example, the material may contain a carbide of the conductive metal, such as aluminum carbide ($Al_4C_3$). If desired, the whiskers may optionally project from a seed portion that is embedded within the substrate. Similar to the whiskers, the seed portion may also be formed from a material that contains carbon and/or a reaction product of carbon and the conductive metal, such as a carbide of the conductive metal (e.g., aluminum carbide). The manner in which such whiskers are formed on the substrate may vary as desired. In one embodiment, for instance, the conductive metal of the substrate is reacted with a hydrocarbon compound. Examples of such hydrocarbon compounds may include, for instance, paraffin hydrocarbon compounds, such as methane, ethane, propane, n-butane, isobutane, pentane, etc.; olefin hydrocarbon compounds, such as ethylene, propylene, butene, butadiene, etc.; acetylene hydrocarbon compounds, such as acetylene; as well as derivatives or combinations of any of the foregoing. It is generally desired that the hydrocarbon compounds are in a gaseous form during the reaction. Thus, it may be desired to employ hydrocarbon compounds, such as methane, ethane, and propane, which are in a gaseous form when heated. Although not necessarily required, the hydrocarbon compounds are typically employed in a range of from about 0.1 parts to about 50 parts by weight, and in some embodiments, from about 0.5 parts by weight to about 30 parts by weight, based on 100 parts by weight of the substrate. To initiate the reaction with the hydrocarbon and conductive metal, the substrate is generally heated in an atmosphere that is at a temperature of about 300° C. or more, in some embodiments about 400° C. or more, and in some embodiments, from about 500° C. to about 650° C. The time of heating depends on the exact temperature selected, but typically ranges from about 1 hour to about 100 hours. The atmosphere typically contains a relatively low amount of oxygen to minimize the formation of a dielectric film on the surface of the substrate. For example, the oxygen content of the atmosphere may be about 1% by volume or less.

The electrodes also contain first and second carbonaceous coatings that are electrically coupled to the first and second current collectors, respectively. While they may be formed from the same or different types of materials and may contain one or multiple layers, each of the carbonaceous coatings generally contains at least one layer that includes activated particles. In certain embodiments, for instance, the activated carbon layer may be directly positioned over the current collector and may optionally be the only layer of the carbonaceous coating. Examples of suitable activated carbon particles may include, for instance, coconut shell-based activated carbon, petroleum coke-based activated carbon, pitch-based activated carbon, polyvinylidene chloride-based activated carbon, phenolic resin-based activated carbon, polyacrylonitrile-based activated carbon, and activated carbon from natural sources such as coal, charcoal or other natural organic sources.

In certain embodiments, it may be desired to selectively control certain aspects of the activated carbon particles, such as their particle size distribution, surface area, and pore size distribution to help improve ion mobility for certain types of electrolytes after being subjected to one or more charge-discharge cycles. For example, at least 50% by volume of the particles (D50 size) may have a size in the range of from about 0.01 to about 30 micrometers, in some embodiments from about 0.1 to about 20 micrometers, and in some embodiments, from about 0.5 to about 10 micrometers. At least 90% by volume of the particles (D90 size) may likewise have a size in the range of from about 2 to about 40 micrometers, in some embodiments from about 5 to about 30 micrometers, and in some embodiments, from about 6 to about 15 micrometers. The BET surface may also range from about 900 $m^2/g$ to about 3,000 $m^2/g$, in some embodiments from about 1,000 $m^2/g$ to about 2,500 $m^2/g$, and in some embodiments, from about 1,100 $m^2/g$ to about 1,800 $m^2/g$.

In addition to having a certain size and surface area, the activated carbon particles may also contain pores having a certain size distribution. For example, the amount of pores less than about 2 nanometers in size (i.e., "micropores") may provide a pore volume of about 50 vol. % or less, in some embodiments about 30 vol. % or less, and in some embodiments, from 0.1 vol. % to 15 vol. % of the total pore volume. The amount of pores between about 2 nanometers and about 50 nanometers in size (i.e., "mesopores") may likewise be from about 20 vol. % to about 80 vol. %, in some embodiments from about 25 vol. % to about 75 vol. %, and in some embodiments, from about 35 vol. % to about 65 vol. %. Finally, the amount of pores greater than about 50 nanometers in size (i.e., "macropores") may be from about 1 vol. % to about 50 vol. %, in some embodiments from about 5 vol. % to about 40 vol. %, and in some embodiments, from about 10 vol. % to about 35 vol. %. The total pore volume of the carbon particles may be in the range of from about 0.2 cm$^3$/g to about 1.5 cm$^3$/g, and in some embodiments, from about 0.4 cm$^3$/g to about 1.0 cm$^3$/g, and the median pore width may be about 8 nanometers or less, in some embodiments from about 1 to about 5 nanometers, and in some embodiments, from about 2 to about 4 nanometers. The pore sizes and total pore volume may be measured using nitrogen adsorption and analyzed by the Barrett-Joyner-Halenda ("BJH") technique as is well known in the art.

Typically, binders are present in an amount of about 60 parts or less, in some embodiments 40 parts or less, and in some embodiments, from about 1 to about 25 parts per 100 parts of carbon in the first and/or second carbonaceous coatings. Binders may, for example, constitute about 15 wt. % or less, in some embodiments about 10 wt. % or less, and in some embodiments, from about 0.5 wt. % to about 5 wt. % of the total weight of a carbonaceous coating. Any of a variety of suitable binders can be used in the electrodes. For instance, water-insoluble organic binders may be employed in certain embodiments, such as styrene-butadiene copolymers, polyvinyl acetate homopolymers, vinyl-acetate ethylene copolymers, vinyl-acetate acrylic copolymers, ethylene-vinyl chloride copolymers, ethylene-vinyl chloride-vinyl acetate terpolymers, acrylic polyvinyl chloride polymers, acrylic polymers, nitrile polymers, fluoropolymers such as polytetrafluoroethylene or polyvinylidene fluoride, polyolefins, etc., as well as mixtures thereof. Water-soluble organic binders may also be employed, such as polysaccharides and derivatives thereof. In one particular embodiment, the polysaccharide may be a nonionic cellulosic ether, such as alkyl cellulose ethers (e.g., methyl cellulose and ethyl cellulose); hydroxyalkyl cellulose ethers (e.g., hydroxyethyl cellulose, hydroxypropyl cellulose, hydroxypropyl hydroxybutyl cellulose, hydroxyethyl hydroxypropyl cellulose, hydroxyethyl hydroxybutyl cellulose, hydroxyethyl hydroxypropyl hydroxybutyl cellulose, etc.); alkyl hydroxyalkyl cellulose ethers (e.g., methyl hydroxyethyl cellulose, methyl hydroxypropyl cellulose, ethyl hydroxyethyl cellulose, ethyl hydroxypropyl cellulose, methyl ethyl hydroxyethyl cellulose and methyl ethyl hydroxypropyl cellulose); carboxyalkyl cellulose ethers (e.g., carboxymethyl cellulose); and so forth, as well as protonated salts of any of the foregoing, such as sodium carboxymethyl cellulose.

If desired, other materials may also be employed within an activated carbon layer of the first and/or second carbonaceous coatings and/or within other layers of the first and/or second carbonaceous coatings. For example, in certain embodiments, a conductivity promoter may be employed to further increase electrical conductivity. Exemplary conductivity promoters may include, for instance, carbon black, graphite (natural or artificial), graphite, carbon nanotubes, nanowires or nanotubes, metal fibers, graphenes, etc., as well as mixtures thereof.

Carbon black is particularly suitable. When employed, conductivity promoters typically constitute about 60 parts or less, in some embodiments 40 parts or less, and in some embodiments, from about 1 to about 25 parts per 100 parts of the activated carbon particles in a carbonaceous coating. Conductivity promotes may, for example, constitute about 15 wt. % or less, in some embodiments about 10 wt. % or less, and in some embodiments, from about 0.5 wt. % to about 5 wt. % of the total weight of a carbonaceous coating. Activated carbon particles likewise typically constitute 85 wt. % or more, in some embodiments about 90 wt. % or more, and in some embodiments, from about 95 wt. % to about 99.5 wt. % of a carbonaceous coating.

II. Electrolyte

The electrolyte employed in the ultracapacitor is generally aqueous in nature. In certain embodiments, for instance, an aqueous electrolyte may be employed that contains water (e.g., deionized water) in an amount from about 30 wt. % to about 90 wt. %, in some embodiments from about 40 wt. % to about 80 wt. %, and in some embodiments, from about 50 wt. % to about 70 wt. %, based on the weight of the electrolyte. The aqueous electrolyte also typically includes a polyprotic acid that is capable of undergoing two or more proton dissociations (e.g., two, three, etc.). Some examples of suitable polyprotic acids that may be employed include, for instance, hydrogen sulfide (diprotic), sulfuric acid (diprotic), sulfurous acid (diprotic), phosophoric acid (triprotic), oxalic acid (diprotic), carbonic acid (diprotic), malonic acid (diprotic), etc. Sulfuric acid ($H_2SO_4$) may, for instance, donate one proton to form a bisulfate anion ($HSO_4^-$) and a second proton to form a sulfate anion ($SO_4^{2-}$). Of course, the electrolyte may also contain monoprotic acidic compounds, such as nitric acid, nitrous acid, hydrochloric acid, perchloric acid, hydroiodic acid, hydrofluoric acid, etc. Polyprotic acid(s) may constitute from about 10 wt. % to about 70 wt. %, in some embodiments from about 20 wt. % to about 60 wt. %, and in some embodiments, from about 25 wt. % to about 50 wt. %, based on the weight of the electrolyte.

III. Separator

A separator is also employed in the ultracapacitor that is positioned between the electrodes. As indicated above, the separator includes a crosslinked polymer film, which is generally formed from an organic polymer, such as vinyl alcohol polymers, vinyl fluoride polymers, polyethylene oxide, polyethyleneimine, polyacrylic acid, polyethylene glycol, cellulose acetate, polyvinylmethylethyl ether, phenol formaldehyde resins, etc. In one particular embodiment, for instance, the organic polymer is a vinyl alcohol polymer, such as polyvinyl alcohol ("PVA"), copolymers of polyvinyl alcohol (e.g., ethylene vinyl alcohol copolymers, methyl methacrylate vinyl alcohol copolymers, etc.), etc. Suitable vinyl alcohol polymers, for instance, have at least two or more vinyl alcohol units in the molecule and may be a homopolymer of vinyl alcohol, or a copolymer containing other monomer units. Vinyl alcohol homopolymers may be obtained by hydrolysis of a vinyl ester polymer, such as vinyl formate, vinyl acetate, vinyl propionate, etc. Vinyl alcohol copolymers may be obtained by hydrolysis of a copolymer of a vinyl ester with an olefin having 2 to 30 carbon atoms, such as ethylene, propylene, 1-butene, etc.; an unsaturated carboxylic acid having 3 to 30 carbon atoms, such as acrylic acid, methacrylic acid, crotonic acid, maleic acid, fumaric acid, etc., or an ester, salt, anhydride or amide thereof; an unsaturated nitrile having 3 to 30 carbon atoms, such as acrylonitrile, methacrylonitrile, etc.; a vinyl ether having 3 to 30 carbon atoms, such as methyl vinyl ether, ethyl vinyl ether, etc.; and so forth. Regardless of the monomers employed, the degree of hydrolysis may be selected to enhance the properties of the film. For example, the degree of hydrolysis may be about 90 mole % or greater, in some embodiments about 95 mole % or greater, and in some embodiments, about 98 mole % or more. For a vinyl alcohol homopolymer, this would mean that about 90 mole % or greater, in some embodiments about 95 mole % or greater, and in some embodiments, about 98 mole % or more of the acetate groups on the parent polymer are hydrolyzed.

If desired, the crosslinked polymer film may also contain a heteropolyacid compound to enhance the ionic conductivity of the separator. Examples of such heteropolyacid compounds may include those have the following general formula:

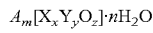

$$A_m[X_xY_yO_z] \cdot nH_2O$$

X and Y are independently boron, aluminum, gallium, silicon, germanium, tin, phosphorus, arsenic, antimony, bismuth, selenium, tellurium, iodine, scandium, yttrium, lanthanum, actinium, titanium, zirconium, hafnium, vanadium, niobium, tantalum, chromium, molybdenum, or tungsten, and wherein X and Y are typically different from each other;

A is hydrogen or a cation;

m is an integer of from 1 to 10, in some embodiments from 1 to 6, and in some embodiments, from 1 to 4 (e.g., 1);

x is an integer of from 1 to 10, in some embodiments from 1 to 6, and in some embodiments, from 1 to 4 (e.g., 1);

y is an integer of from 2 to 20, in some embodiments from 3 to 18, and in some embodiments, from 4 to 15 (e.g., 12);

z is an integer of from 10 to 100, in some embodiments from 20 to 80, and in some embodiments, from about 30 to 60; and n is an integer of from 0 to 150, in some embodiments from 1 to 100, and in some embodiments, from 20 to 80.

As used herein, the term "heteropolyacid compound" includes salts and/or hydrates. In certain embodiments, for example, A in the formula above may be a cation, such as calcium, ammonium, sodium, potassium, aluminum, etc., so that the compound is in the form of a salt. Likewise, n in the formula above may be 1 or more so that the compound is in the form of a hydrate. Specific examples of heteropolyacid compounds include, for instance, dodecamolybdophosphoric acid, ammonium molybdophosphate, sodium molybdophosphate, potassium molybdophosphate, lithium molybdophosphate, calcium molybdophosphate, magnesium molybdophosphate, dodecatungstophosphoric acid, ammonium tungstophosphate, sodium tungstophosphate, potassium tungstophosphate, lithium tungstophosphate, calcium tungstophosphate, magnesium tungstophosphate, dodecamolybdosilicic acid, ammonium molybdosilicate, sodium molybdosilicate, potassium molybdosilicate, lithium molybdosilicate, calcium molybdosilicate, magnesium molybdosilicate, dodecamolybdogermanic acid, ammonium molybdogermanate, sodium molybdogermanate, potassium molybdogermanate, lithium molybdogermanate, calcium molybdogermanate, magnesium molybdogermanate, hexamolybdotelluric acid, ammonium molybdotellurate, sodium molybdotellurate, potassium molybdotellurate, lithium molybdotellurate, calcium molybdotellurate, magnesium molybdotellurate, dodecatungstosilicic acid, ammonium tungstosilicate, sodium tungstosilicate, potassium tungstosilicate, lithium tungstosilicate, calcium tungstosilicate, magnesium tungstosilicate, etc.

The electrodes, separator, and electrolyte may be assembled together using any of a variety of different techniques as are known in the art. For example, the carbonaceous coatings of each electrode may be formed by initially mixing the carbonaceous particles with the aqueous electrolyte to form a paste. The solids content of the paste is typically from about 5 wt. % to about 55 wt. %, in some embodiments from about 10 wt. % to about 50 wt. %, and in some embodiments, from about 15 wt. % to about 40 wt. %. For example, the carbonaceous particles typically constitute from about 5 wt. % to about 50 wt. %, in some embodiments from about 10 wt. % to about 40 wt. %, and in some embodiments, from about 15 wt. % to about 30 wt. % of the paste. The aqueous electrolyte may also constitute from about 50 wt. % to about 95 wt. %, in some embodiments from about 60 wt. % to about 90 wt. %, and in some embodiments, from about 70 wt. % to about 85 wt. % of the paste. For instance, polyprotic acids may constitute from about 10 wt. % to about 40 wt. %, in some embodiments from about 15 wt. % to about 35 wt. %, and in some embodiments, from about 20 wt. % to about 30 wt. % of the paste, and water may constitute from about 30 wt. % to about 70 wt. %, in some embodiments from about 35 wt. % to about 65 wt. %, and in some embodiments, from about 40 wt. % to about 60 wt. % of the paste. The resulting paste may then be applied to a current collector to form the electrode structure using any known technique, such as printing (e.g., rotogravure), spraying, slot-die coating, drop-coating, dip-coating, etc.

To form the separator, the organic polymer and optional heteropolyacid compound may initially be formed into a solution. Typically, the heteropolyacid compound is present in an amount of from about 10 parts to about 85 parts by weight, in some embodiments from about 20 parts to about 80 parts by weight, and in some embodiments, from about 30 parts to about 70 parts by weight, based on 100 parts by weight of organic polymers. In certain embodiments, for instance, an aqueous solvent (e.g., water) may be employed to facilitate the formation of the solution. Once formed, the resulting solution may then be applied using any of a variety of different techniques, such as casting, drop coating, printing, etc. In one particular embodiment, for instance, the solution may be cast onto a pre-formed electrode assembly. Although not necessarily required, contact of the organic polymer with the polyprotic acid (e.g., sulfuric acid) within the aqueous electrolyte can cause the polymer to crosslink and thereby form a film having a sufficient degree of strength and integrity to serve as the separator structure.

IV. Housing

The ultracapacitor of the present invention may employ a housing within which the electrodes, electrolyte, and separator are retained and sealed. The nature of the housing may vary as desired. In certain embodiments, for example, the housing may contain a metal container, such as those formed from tantalum, niobium, aluminum, nickel, hafnium, titanium, copper, silver, steel (e.g., stainless), alloys thereof, composites thereof (e.g., metal coated with electrically conductive oxide), and so forth. Aluminum is particularly suitable for use in the present invention. The metal container may have any of a variety of different shapes, such as cylindrical, D-shaped, prismatic, rectangular, etc. Of course, in other embodiments, the housing may be in the form of a flexible package that encloses the components of the ultracapacitor. The flexible package may contain any number of layers desired to achieve the desired level of properties, such as 1 or more, in some embodiments 2 or more, and in some embodiments, from 2 to 4 layers. Typically, the package contains a barrier layer, which may include a metal, such as aluminum, nickel, tantalum, titanium, stainless steel, etc. Such a barrier layer is generally impervious to the electrolyte so that it can inhibit leakage thereof, and also generally impervious to water and other contaminants. If desired, the package may also contain an outer layer that serves as a protective layer for the package. In this manner, the barrier layer is positioned between the outer layer and the electrode assembly. The outer layer may, for instance, be formed from a polymer film, such as those formed from a polyolefin (e.g., ethylene copolymers, propylene copolymers, propylene homopolymers, etc.), polyesters, etc. Particularly suitable polyester films may include, for example, polyethylene terephthalate, polyethylene naphthalate, polybutylene terephthalate, etc.

If desired, the package may also contain an inner layer that is positioned between the electrode assembly and the barrier layer. In certain embodiments, the inner layer may contain a heat-sealable polymer. Suitable heat-sealable polymers may include, for instance, vinyl chloride polymers, vinyl chloridine polymers, ionomers, etc., as well as combinations thereof. Ionomers are particularly suitable. In one embodiment, for instance, the ionomer may be a copolymer that contains an α-olefin and (meth)acrylic acid repeating unit. Specific α-olefins may include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Ethylene is particularly suitable. As noted, the copolymer may also a (meth)acrylic acid repeating unit. As used herein, the term "(meth)acrylic" includes acrylic and methacrylic monomers, as well as salts or esters thereof, such as acrylate and methacrylate monomers. Examples of such (meth) acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof. Typically, the α-olefin/(meth) acrylic acid copolymer is at least partially neutralized with a metal ion to form the ionomer. Suitable metal ions may include, for instance, alkali metals (e.g., lithium, sodium, potassium, etc.), alkaline earth metals (e.g., calcium, magnesium, etc.), transition metals (e.g., manganese, zinc, etc.), and so forth, as well as combinations thereof. The metal ions may be provided by an ionic compound, such as a metal formate, acetate, nitrate, carbonate, hydrogen carbonate, oxide, hydroxide, alkoxide, and so forth.

The embodiments described above generally refer to the use of a single electrochemical cell in the capacitor. It should of course be understood, however, that the capacitor of the present invention may also contain two or more electrochemical cells. In one such embodiment, for example, the capacitor may include a stack of two or more electrochemical cells, which may be the same or different. Furthermore, it should also be understood that the ultracapacitor may be employed in combination with other types of active and/or passive electronic components. In one embodiment, for instance, the ultracapacitor may be employed in combination with a battery cell to form a hybrid energy storage system. Examples of such battery cells may include, for instance, a lead-acid battery, nickel-cadmium battery, nickel-metal hydride battery, lithium ion battery, lithium polymer battery, lithium ion polymer electrolyte battery, zinc air battery, etc., as well as combinations thereof.

Test Methods

Leakage Current

Leakage current may be measured using a leakage test meter at a temperature of 25° C. and at the rated voltage (e.g., 3.3 to 12 volts) and after a certain period of time (e.g., 180 minutes).

Equivalent Series Resistance (ESR)

Equivalence series resistance may be measured using a Keithley 3330 Precision LCZ meter with a DC bias of 10 millivolts. The operating frequency is 1 kHz. A variety of temperature and relative humidity levels may be tested. For example, the temperature may be 25° C., 60° C., 70° C., or 75° C., and the relative humidity may be 25% or 85%.

Capacitance

The capacitance may be measured using a Keithley 3330 Precision LCZ meter with a DC bias of 0.0 volts, 1.1 volts, or 2.1 volts (0.5 volt peak to peak sinusoidal signal). The operating frequency is 120 Hz. A variety of temperature and relative humidity levels may be tested. For example, the temperature may be 25° C., 60° C., or 75° C., and the relative humidity may be 25% or 85%.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An ultracapacitor comprising an electrochemical cell that contains a first electrode, a second electrode, a separator positioned between the first and second electrodes, and an aqueous electrolyte that is ionic contact with the first and second electrodes, wherein the first electrode comprises a first current collector electrically coupled to a first carbonaceous coating and the second electrode comprises a second current collector electrically coupled to a second carbonaceous coating, wherein the separator contains a crosslinked polymer film formed from a vinyl alcohol polymer, a polyethylene oxide, a polyethyleneimine, a polyethylene glycol, a cellulose acetate, a polyvinylmethylethyl ether, or a phenol formaldehyde resin, and further wherein after being subjected to an applied voltage for 180 minutes, the ultracapacitor exhibits a leakage current of only about 1 microamp or less and wherein the ratio of the thickness of the crosslinked polymer film to the thickness of the electrochemical cell is from about 0.05 to about 1.

2. The ultracapacitor of claim 1, wherein the first and second current collectors contain a conductive metal.

3. The ultracapacitor of claim 2, wherein the conductive metal is aluminum or an alloy thereof.

4. The ultracapacitor of claim 1, wherein the first carbonaceous coating, the second carbonaceous coating, or both contain activated carbon particles.

5. The ultracapacitor of claim 4, wherein at least 50% by volume of the activated carbon particles have a size of from about 0.01 to about 30 micrometers.

6. The ultracapacitor of claim 4, wherein the activated carbon particles have a BET surface area of from about 900 $m^2/g$ to about 3,000 $m^2/g$.

7. The ultracapacitor of claim 6, wherein the activated carbon particles contain a plurality of pores, wherein the amount of pores having a size of about 2 nanometers or less is about 50 vol. % or less of the total pore volume, the amount of pores having a size of from about 2 nanometers to about 50 nanometers is about 20 vol. % to about 80 vol. % of the total pore volume, and the amount of pores having a size of about 50 nanometers or more is from about 1 vol. % to about 50 vol. % of the total pore volume.

8. The ultracapacitor of claim 1, wherein the aqueous electrolyte includes a polyprotic acid.

9. The ultracapacitor of claim 8, wherein the polyprotic acid is sulfuric acid.

10. The ultracapacitor of claim 1, wherein the crosslinked polymer film is formed from a vinyl alcohol polymer.

11. The ultracapacitor of claim 1, wherein the film contains a heteropolyacid compound having the following general formula:

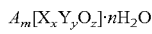

$A_m[X_xY_yO_z]\cdot nH_2O$

X and Y are independently boron, aluminum, gallium, silicon, germanium, tin, phosphorus, arsenic, antimony, bismuth, selenium, tellurium, iodine, scandium, yttrium, lanthanum, actinium, titanium, zirconium, hafnium, vanadium, niobium, tantalum, chromium, molybdenum, or tungsten;
A is hydrogen or a cation;
m is an integer of from 1 to 10;
x is an integer of from 1 to 10;
y is an integer of from 2 to 20;
z is an integer of from 10 to 100; and
n is an integer of from 0 to 150.

12. The ultracapacitor of claim 11, wherein the heteropolyacid compound is dodecamolybdophosphoric acid, ammonium molybdophosphate, sodium molybdophosphate, potassium molybdophosphate, lithium molybdophosphate, calcium molybdophosphate, magnesium molybdophosphate, dodecatungstophosphoric acid, ammonium tungstophosphate, sodium tungstophosphate, potassium tungstophosphate, lithium tungstophosphate, calcium tungstophosphate, magnesium tungstophosphate, dodecamolybdosilicic acid, ammonium molybdosilicate, sodium molybdosilicate, potassium molybdosilicate, lithium molybdosilicate, calcium molybdosilicate, magnesium molybdosilicate, dodecamolybdogermanic acid, ammonium molybdogermanate, sodium molybdogermanate, potassium molybdogermanate, lithium molybdogermanate, calcium molybdogermanate, magnesium molybdogermanate, hexamolybdotelluric acid, ammonium molybdotellurate, sodium molybdotellurate, potassium molybdotellurate, lithium molybdotellurate, calcium molybdotellurate, magnesium molybdotellurate, dodecatungstosilicic acid, ammonium tungstosilicate, sodium tungstosilicate, potassium tungstosilicate, lithium tungstosilicate, calcium tungstosilicate, magnesium tungstosilicate, or a combination thereof.

13. The ultracapacitor of claim 1, further comprising a housing within which the first electrode, the second electrode, the separator, and the electrolyte are retained.

14. The ultracapacitor of claim 1, wherein the separator contains a crosslinked polymer film formed from a polyethylene oxide, a polyethyleneimine, a polyethylene glycol, a cellulose acetate, a polyvinylmethylethyl ether, or a phenol formaldehyde resin.

15. The ultracapacitor of claim 1, wherein the separator contains a crosslinked polymer film formed from a polyethyleneimine, a cellulose acetate, a polyvinylmethylethyl ether, or a phenol formaldehyde resin.

16. An ultracapacitor comprising an electrochemical cell that contains a first electrode, a second electrode, a separator positioned between the first and second electrodes, and an aqueous electrolyte that is ionic contact with the first and second electrodes,
wherein the first electrode comprises a first current collector electrically coupled to a first carbonaceous coating and the second electrode comprises a second current collector electrically coupled to a second carbonaceous coating,
wherein the separator contains a crosslinked polymer film formed from a vinyl alcohol polymer, a polyethylene oxide, a polyethyleneimine, a polyethylene glycol, a cellulose acetate, a polyvinylmethylethyl ether, or a phenol formaldehyde resin and wherein the crosslinked polymer film has a thickness of from about 500 micrometers to about 10,000 micrometers.

17. The ultracapacitor of claim 16, wherein after being subjected to an applied voltage for 180 minutes, the ultracapacitor exhibits a leakage current of only about 1 microamp or less.

18. An ultracapacitor comprising an electrochemical cell that contains a first electrode, a second electrode, a separator positioned between the first and second electrodes, and an aqueous electrolyte that is ionic contact with the first and second electrodes,
wherein the first electrode comprises a first current collector electrically coupled to a first carbonaceous coating and the second electrode comprises a second current collector electrically coupled to a second carbonaceous coating,
wherein the separator contains a crosslinked polymer film that contains a heteropolyacid compound having the following general formula:

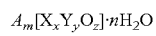

$A_m[X_xY_yO_z]\cdot nH_2O$

X and Y are independently boron, aluminum, gallium, silicon, germanium, tin, phosphorus, arsenic, antimony, bismuth, selenium, tellurium, iodine, scandium, yttrium, lanthanum, actinium, titanium, zirconium, hafnium, vanadium, niobium, tantalum, chromium, molybdenum, or tungsten;
A is hydrogen or a cation;
m is an integer of from 1 to 10;
x is an integer of from 1 to 10;
y is an integer of from 2 to 20;
z is an integer of from 10 to 100; and
n is an integer of from 0 to 150.

* * * * *